United States Patent [19]
Paniccia

[11] Patent Number: 6,052,498
[45] Date of Patent: Apr. 18, 2000

[54] METHOD AND APPARATUS PROVIDING AN OPTICAL INPUT/OUTPUT BUS THROUGH THE BACK SIDE OF AN INTEGRATED CIRCUIT DIE

[75] Inventor: Mario J. Paniccia, Santa Clara, Calif.

[73] Assignee: Intel Corporation, Santa Clara, Calif.

[21] Appl. No.: 08/994,980

[22] Filed: Dec. 19, 1997

[51] Int. Cl.[7] .................................................. G02B 6/12
[52] U.S. Cl. ........................................................ 385/14
[58] Field of Search ............................................. 385/14

[56] References Cited

U.S. PATENT DOCUMENTS

| | | | |
|---|---|---|---|
| 4,422,088 | 12/1983 | Gfeller | 385/37 |
| 4,695,120 | 9/1987 | Holder | 385/14 |
| 4,758,092 | 7/1988 | Heinrich et al. | 356/364 |
| 4,761,620 | 8/1988 | Bar-Joseph et al. | 332/7.51 |
| 4,865,427 | 9/1989 | Kingston et al. | 350/355 |
| 4,871,224 | 10/1989 | Karstensen et al. | 385/14 |
| 4,917,450 | 4/1990 | Pocholle et al. | 385/14 |
| 4,966,430 | 10/1990 | Weidel | 385/14 |
| 5,061,027 | 10/1991 | Richard | 385/14 |
| 5,153,770 | 10/1992 | Harris | 359/245 |
| 5,159,700 | 10/1992 | Reid et al. | 385/14 |
| 5,198,684 | 3/1993 | Sudo | 257/79 |
| 5,400,419 | 3/1995 | Heinen | 385/14 |
| 5,432,630 | 7/1995 | Lebby et al. | 359/152 |
| 5,434,434 | 7/1995 | Kasahara et al. | 257/84 |
| 5,485,021 | 1/1996 | Abe | 257/84 |
| 5,502,779 | 3/1996 | Magel | 385/1 |
| 5,568,574 | 10/1996 | Tanguay, Jr. et al. | 385/14 |
| 5,605,856 | 2/1997 | Goosen et al. | 438/24 |
| 5,625,636 | 4/1997 | Bryan et al. | 372/50 |
| 5,629,838 | 5/1997 | Knight et al. | 361/782 |
| 5,638,469 | 6/1997 | Feldman et al. | 385/14 |
| 5,696,862 | 12/1997 | Hauer et al. | 385/88 |
| 5,835,646 | 11/1998 | Yoshimura et al. | 385/14 |
| 5,864,642 | 1/1999 | Chun et al. | 385/14 |
| 5,872,360 | 2/1999 | Paniccia et al. | |

OTHER PUBLICATIONS

Miller, DAB: "Reason and Prospects for Dense Optical Interconnections", Presentation by Stanford University Professor, (Oct. 1997).

Sakano, S. et al.: "InGaAsP/InP Monolithic Integrated Circuit with Lasers and an Optical Switch," *Electronics Letters*, 22(11), May 1986.

Mansuripur, M. and Goodman, JW: "Signal and Noise in Magneto–Optical Readout," *J. Appl. Phys.*, 53(6), Jun. 1982.

Alping, A et al.: "Highly Efficient Waveguide Phase Modulator for Integrated Optoelectronics," *Appl. Phys. Lett.*, 48(19), May 1986.

Levitan, SP et al.: "Computer–Aided Design of Free–Space Opto–Electronic Systems," *DAC 97*, Anaheim, California (1997), No Month Available.

Goodman, JW et al.: "Optical Interconnections for VLSI Systems," *Proc. IEEE*, 72(7), Jul. 1984.

Wang, C. et al.: "Ultrafast, All–Silicon Light Modulator," *Optics Letters*, 19(18), Sep. 1994.

(List continued on next page.)

*Primary Examiner*—John D. Lee
*Assistant Examiner*—Michael J. Stahl
*Attorney, Agent, or Firm*—Blakely, Sokoloff, Taylor & Zafman LLP

[57] ABSTRACT

A method and an apparatus providing an optical input/output bus in an integrated circuit by optically routing input/output signals between integrated circuit nodes. In one embodiment, input/output signals are optically routed back and forth through the back side semiconductor substrate of a flip chip packaged integrated circuit die. An optical assembly used to generate and direct the light beams of the optical bus may be included within a heat sink thermally coupled to the back side silicon substrate of the integrated circuit die. Alternatively, the optical assembly may be embedded into the back side silicon substrate of the integrated circuit die. In operation, a light beam is directed through the back side semiconductor substrate onto an optical modulator. The optical modulator modulates and deflects the light beam. The deflected light beam is routed to a deflector that directs the modulated and deflected light beam through the back side semiconductor substrate onto an optical demodulator.

31 Claims, 7 Drawing Sheets

OTHER PUBLICATIONS

Tada, K. and Okada, Y: "Bipolar Transistor Carrier–Injected Optical Modulator/Switch: Proposal and Analysis," *IEEE Electr Dev Ltrs*, 7(11), Nov. 1986.

Fernando, C. et al: "Si/Si$_{o.85}$/GE$_{o.15}$/Si P–I–N Waveguide Optical Intensity Modulator," *SPIE*, vol. 2402(131), 1995, No Month Available.

Heinrich, HK: "A Noninvasive Optical Probe for Detecting Electrical Signals in Silicon Integrated Circuits", Doctoral Dissertation, Stanford Univ., (Apr., 1987).

Raybon, G., et al.: "A Reconfigurable Optoelectronic Wavelength Converter based on an Integrated Electroabsorption Modulated Laser Array" in *1997 Digest of the IEEE/LEOS Summer Topical Meetings,* Montreal, Quebec, Canada, Aug. 1997.

Reiley, DJ, and Sasian JM: "Optical Design of a Free–Space Photonic Switching System" in *Applied Optics,* vol. 36(19), Jul. 1997.

Koren, U., et al.: "A Polarization Insensitive Semiconductor Optical Amplifier with Integrated Electroabsorption Modulators" in *Integrated Photonics Research,* Apr. 29–May 2, 1996 Technical Digest Series, vol. 6, 1996.

Krishnamoorthy, AV, and Miller, DAB : "Free–Space Optical Interconnections for VLSI Systems: A Technology Roadmap", *Conference Proceedings Leos '96 9th Annual MeetingU* IEEE Lasers and Electro–Optics (vol. 1), Nov. 1996.

Goosen, KW: "GaAs MQW Modulators Integrated With Silicon CMOS" in *IEEE Photonics Technology Letters,* vol. 7(4), Apr. 1995.

"Optoelectronic VLSI Foundry Services From Lucent Technologies", *Lucent Technologies Bell Labs Innovations Web Page* at http://www.bell–labs.com/project/oevlsi/, updated Mar. 2, 1997.

"Process for Fabricating OE/VLSI Chips",", *Lucent Technologies Bell Labs Innovations Web Page* at http://www-.bell–labs.com/project/oevlsi/wfabproc.html, updated Sep. 26, 1996.

"Detailed Design Rules for Workshop Chips",", *Lucent Technologies Bell Labs Innovations Web Page* at http://www.bell–labs.com/project/oevlsi/wdesrule.html, updated Mar. 7, 1997.

Kuwamura, Y, et al.: "Analysis of Operating Mechanism in Semiconductor Optical Modulator with Electron–Depleting Absorption Control" in *Electronics and Communications in Japan,* vo. 79(5), Dec. 1995.

Liu, MY and Chou, SY: "High–Modulation–Depth and Short–Cavity–Length Silicon Fabry–Perot Modulator with Two Grating Bragg Reflectors" in *Appl. Phys. Lett.* vol. 68(2), Jan. 1996.

Orobtchouk, R., et al.: "Quasi–TEoo Singlemode Optical Waveguides for Electro–optical Modulation at 1.3 $\mu$m Using Standard SIMOX Material" in *IEEE Proc. Optoelectron,* vol. 144(2) Apr. 1997.

Soref, RA: "Electrooptical Effects of Silicon" in *IEEE J of Quantum Electron.* vol. QE–23(1), Jan. 1997.

Cutolo, A., et al.: "An Electrically Controlled Bragg Reflector Integrated in a Rib Silicon on Insulator Waveguide" in *Appl. Phys. Lett.* vol. 71(2), Jul. 1997.

Cutolo, A., et al.: Silicon Electro–Optic Modulator Based on a Three Terminal Device Integrated in a Low–Loss Single–Mode SOI Waveguide in *J. of Lightwave Technology,* vol. 15(3), Mar. 1997.

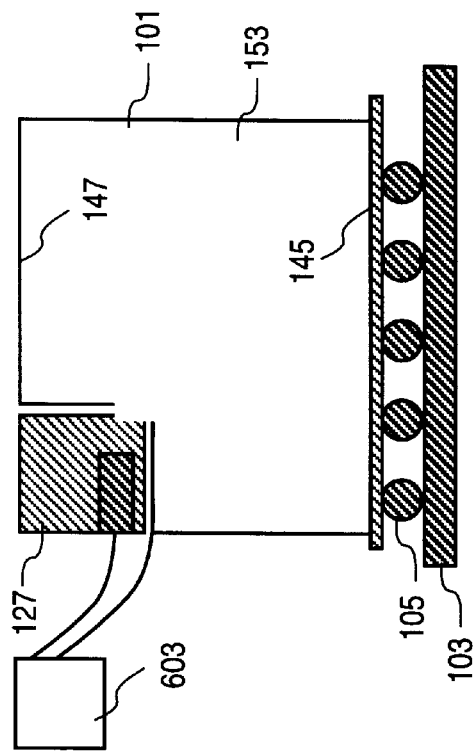
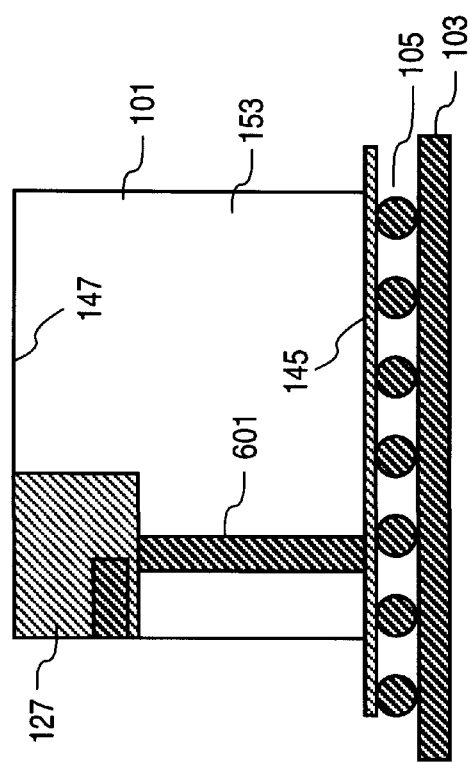
FIG. 6A
FIG. 6B

METHOD AND APPARATUS PROVIDING AN OPTICAL INPUT/OUTPUT BUS THROUGH THE BACK SIDE OF AN INTEGRATED CIRCUIT DIE

RELATED APPLICATIONS

This application is also related to co-pending application Ser. No. 08/995,277, filed Dec. 19, 1997, entitled "Method And Apparatus Providing Optical Input/Output Through the Back Side of an Integrated Circuit Die," and assigned to the Assignee of the present application.

This application is also related to co-pending application Ser. No. 08/993,786, filed Dec. 19, 1997, entitled "Method And Apparatus For Optically Modulating Light Through The Back Side Of An Integrated Circuit Die," and assigned to the Assignee of the present application.

BACKGROUND OF THE INVENTION

1. Field of the Invention

The present invention relates generally to an integrated circuit bus and, more specifically, the present invention relates to an optical integrated circuit bus.

2. Description of the Related Art

Within the integrated circuit industry there is a continuing effort to increase integrated circuit speed as well as device density. One challenge that integrated circuit designers face with increasing circuit speeds and device densities is the increasingly significant propagation delays of circuit inputs and outputs due to the capacitive loading associated with circuit connections. At slower clock speeds, the capacitive loading on integrated circuit lines is generally not a significant factor. However, as newer integrated circuit design clock speeds continue to climb towards the gigahertz range and beyond, it is evident that one of the major bottlenecks for future integrated circuits, such as for example but not limited to microprocessors, off chip caches, controllers, etc., is the input/output bandwidth and/or round trip delay between and within chips.

Prior art attempts to address the capacitive loading problems associated with increased integrated circuit speeds and device densities have resulted in the use of larger and more powerful integrated circuit input/output drivers on the chip. An undesirable consequence of utilizing larger input/output drivers is that the larger input/output drivers generally consume more power, dissipate more heat and occupy more of valuable area on the integrated circuit die than smaller integrated circuit input/output drivers.

Other prior art attempts to overcome traditional integrated circuit connection limitations have included the use of optical interconnections. Some approaches at optically interconnecting integrated circuits are based on using either gallium arsenide (GaAs) laser diodes and modulating or switching the diodes electrically, or secondly, by using gallium and arsenide-built modulators that amplitude modulate a laser beam passing through an integrated circuit. The modulation used in these prior art approaches is based on electroabsorbtion through strained multi-layer grown molecular beam epitaxy (MBE) films in GaAs integrated circuits. As can be appreciated to those skilled in the art, it is difficult and therefore impractical to integrate or combine III-V based technology, which includes GaAs, with standard silicon based complementary metal oxide semiconductor (CMOS) technology.

Accordingly, what is desired is a method and an apparatus providing high speed optical input/output bus in an integrated circuit. Such a method and apparatus should enable high speed optical input/output and be compatible with present day CMOS integrated circuit technology. Such a method and apparatus should also enable the use of relatively smaller integrated circuit input/output drivers such that reduced amounts of power are consumed and less integrated circuit die area is occupied.

SUMMARY OF THE INVENTION

An optical bus is disclosed. In one embodiment, the disclosed optical bus includes an optical unit generating a light beam and an optical assembly directing the light beam through a back side of a flip chip packaged integrated circuit die onto a first optical input/output device. The optical input/output device is disposed within a semiconductor substrate of the integrated circuit die. The optical assembly directs a deflected light beam deflected from the first optical input/output device onto a second optical input/output device disposed within the semiconductor substrate of the integrated circuit die. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

FIG. 6A is an illustration of one embodiment of a cross section of a light source embedded into the back side of the semiconductor substrate in accordance with the teachings of the present invention.

FIG. 6B is an illustration of another embodiment of a cross section of a light source embedded into the back side of the semiconductor substrate in accordance with the teachings of the present invention.

DETAILED DESCRIPTION

A method and an apparatus providing an optical bus in an integrated circuit is disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

The present invention provides optical input/output in an integrated circuit by optically routing input/output signals between integrated circuit nodes. In one embodiment, input/output signals are optically routed back and forth through the back side semiconductor substrate of a flip chip packaged integrated circuit using present day silicon-based CMOS technology. Since the input/output signals are optically coupled, the electrical loading problems that plague prior art input/output interconnections are reduced, thereby enabling increased input/output bandwidth while simultaneously using smaller integrated circuit input/output drivers. With smaller integrated circuit input/output drivers, integrated circuit chip area and power can be conserved. In one embodiment, an optical unit is used to generate and direct the light beams into an optical assembly, which routes the light beams of the optical bus. In one embodiment, the optical unit and optical assembly are included within a heat sink thermally coupled to the back side silicon substrate of the integrated circuit die. In another embodiment, the optical unit is embedded directly into the back side silicon substrate of the integrated circuit die, thereby allowing standard heat sinks to be utilized to cool the integrated circuit die.

It is noted that other optical input/output techniques through the back side silicon substrate of flip chip packaged integrated circuit dice are described in co-pending application Ser. No. 08/995,277, filed Dec. 19, 1997, entitled "Method And Apparatus Providing Optical Input/Output Through the Back Side of an Integrated Circuit Die," and assigned to the Assignee of the present application.

Figure 1:
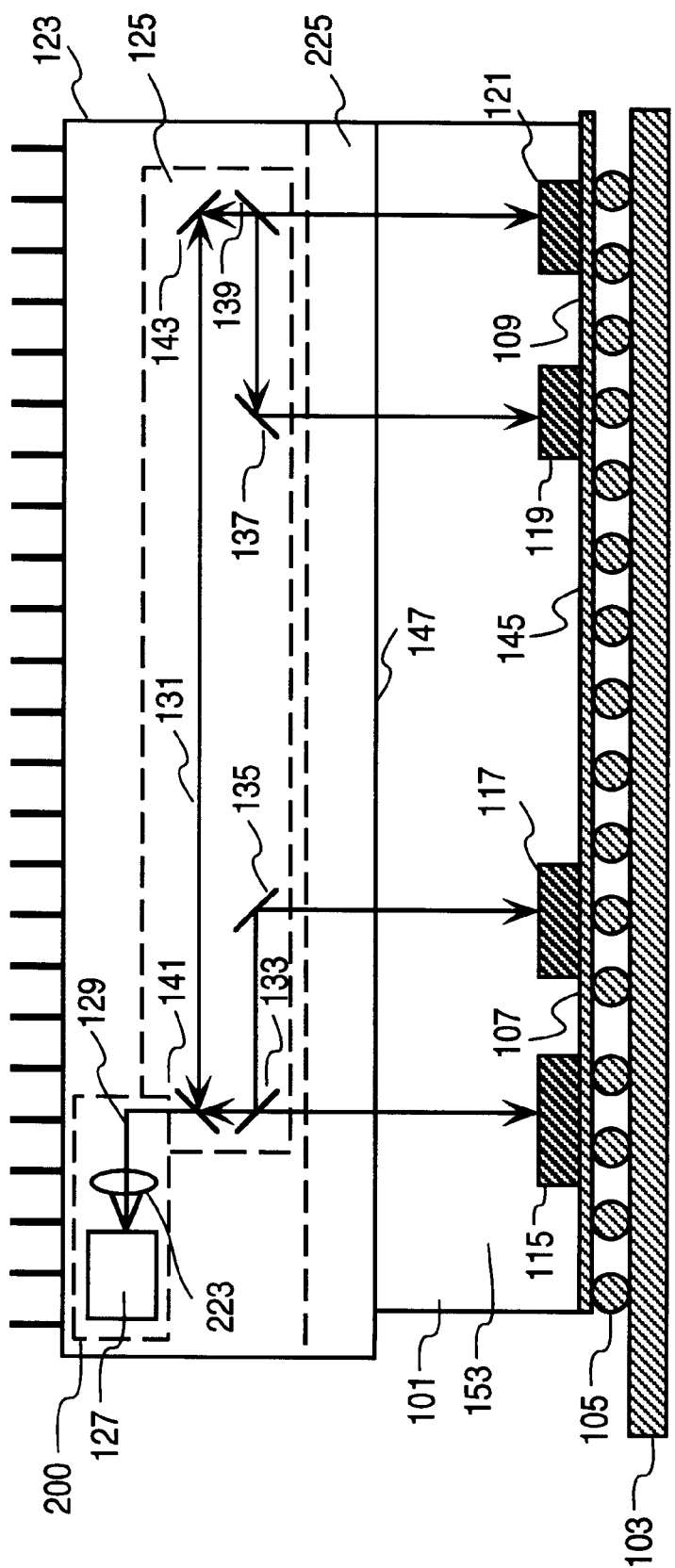
FIG. 1 is an illustration of one embodiment of a cross section of a flip chip packaged integrated circuit die with optical input/output devices disposed within the semiconductor substrate and an attached heat sink with an optical assembly in accordance with the teachings of the present invention.

FIG. 1 is an illustration of one embodiment of an integrated circuit die 101 including an optical input/output bus in accordance with the teachings of the present invention. In one embodiment, integrated circuit die 101 is a controlled collapse circuit connection (C4) or flip chip packaged integrated circuit die coupled to package substrate 103 through ball bonds 105. As can be appreciated to those skilled in the art, ball bonds 105 provide more direct connections between the internal integrated circuit nodes of integrated circuit die 101 and the pins of packaged substrate 103, thereby reducing inductance problems associated with typical wire bond integrated circuit packaging technologies. Another characteristic of flip chip packaging is that full access to the back side 147 of integrated circuit die 101 is provided.

In one embodiment, semiconductor substrate 153 is silicon-based and includes existing present day CMOS processing technology. In one embodiment, first, second, third and fourth optical input/output devices 115, 117, 119 and 121, respectively, are disposed within semiconductor substrate 153, as illustrated in FIG. 1. In one embodiment, first and second optical input/output devices 115 and 117 are coupled to a first integrated circuit node 107, and third and fourth optical input/output devices 119 and 121 are coupled to a second integrated circuit node 109 in integrated circuit die 101.

In one embodiment, first and fourth optical input/output devices 115 and 121 are optical modulators and second and third optical input/output devices 117 and 119 are optical demodulators. In one embodiment, first and fourth optical input/output devices 115 and 121 utilize known semiconductor-based optical modulating techniques, such as for example but not limited to silicon-based optical modulation, polysilicon-based optical modulation, waveguide-based optical modulation, plasma optical modulation, etc. In one embodiment, second and third optical input/output devices 117 and 119 utilize known optical demodulation techniques, such as for example but not limited to active diffusion photo-diode receiver and amplifier circuits.

It is noted that other optical modulators and demodulators used for optically coupling integrated circuit input/outputs through the back side silicon substrate of flip chip packaged integrated circuit dice are described in co-pending application Ser. No. 08/993,786, filed Dec. 19, 1997, entitled "Method And Apparatus For Optically Modulating Light Through The Back Side Of An Integrated Circuit Die," and assigned to the Assignee of the present application.

In one embodiment, a thermal conductor or heat sink 123 is thermally and optically coupled to back side 147 of integrated circuit die 101. As shown in FIG. 1, one embodiment of heat sink 123 includes an optical unit 200 generating a light beam 129 received by an optical assembly 125. In one embodiment, optical unit 200 includes a light source 127, which generates light beam 129, and a lens 223, which focuses and collimates light beam 129. In one embodiment, optical assembly 125 includes first, second, third, fourth, fifth and sixth beam splitters/deflectors 133, 135, 137, 139, 141 and 143, respectively.

In one embodiment, light source 127 includes an infrared laser diode. As is known to those skilled in the art, silicon is partially transparent to infrared light. Therefore, as will be discussed in greater detail below, using the infrared light generated by light source 127, first, second, third and fourth optical input/output devices 115, 117, 119 and 121, respectively, are optically coupled through the silicon-based semiconductor substrate 153 through back side 147 of integrated circuit die 101. It is appreciated that other embodiments of integrated circuit die 101 may include any number of combinations of optical input/output devices or optical modulators and demodulators in accordance with the teachings of the present invention.

In one embodiment, heat sink 123 includes an infrared transparent spacer 225 disposed between optics assembly 125 and back side 147 of semiconductor substrate 153. Infrared transparent spacer 225 acts as a heat spreader and helps to reduce thermal expansion issues related to optics assembly 125. In one embodiment, infrared transparent spacer 225 may include chemical vapor deposition (CVD) grown diamond, silicon, silicon carbide or other similar thermally conductive infrared transparent materials.

In one embodiment, light source 127 generates an infrared light beam 129, which passes through lens 223, through fifth beam splitter/deflector 141 and is directed to first beam splitter/deflector 133. In one embodiment, a portion of light beam 129 is directed by first beam splitter/deflector 133 to first optical input/output device 115 through semiconductor substrate 153 through back side 147. Indeed, since light beam 129 is infrared light and since semiconductor substrate 153 is silicon, light beam 129 penetrates and travels through semiconductor substrate 153 to reach first optical input/output device 115 from back side 147.

In one embodiment, light beam 129 is deflected from and modulated by optical input/output device 115 in response to an electrical output signal at first integrated circuit node 107 in integrated circuit die 101. As shown in FIG. 1, a deflected light beam 131, is deflected from first optical input/output device 115, travels back through and out semiconductor substrate 153, passes through first beam splitter/deflector 133 and is directed by fifth beam splitter/deflector 141 to sixth beam splitter/deflector 143. Deflected beam 131 is then directed to fourth beam splitter/deflector 139 and is then directed to third beam splitter/deflector 137. Deflected beam 131 is then directed to third optical input/output device 119 through semiconductor substrate 153 through back side 147. In one embodiment, third optical input/output device 119 demodulates the modulated deflected light beam 131 to reproduce the electrical output signal generated at first integrated circuit node 107 to produce an input signal that is received at second integrated circuit node 109 in integrated circuit die 101.

In one embodiment, it is noted that a portion of deflected light beam 131 also passes through fourth beam splitter/deflector 139 such that deflected light beam 131 is directed to fourth optical input/output device 121 through semiconductor substrate 153 through back side 147. In one embodiment, deflected light beam 131 is deflected from fourth optical input/output device 121 and is modulated by fourth optical input/output device 121 in response to an output signal at second integrated circuit node 109. The deflected light beam 131 that is modulated in response to the output signal at second integrated circuit node 109 and reflected from fourth optical input/output device 121 passes back through semiconductor substrate 153, through back side 147, through fourth beam splitter/deflector 139 and is then directed to second optical input/output device 117 through sixth beam splitter/deflector 143, fifth beam splitter/deflector 141, first beam spliiter/deflector 133, second beam splitter/deflector 135 and then through semiconductor substrate 153 through back side 147. In one embodiment, second optical input/output device 117 demodulates the modulated deflected beam 131 such that the output signal at second integrated circuit node 109 is reproduced as an input signal at first integrated circuit node 107.

Therefore, in one embodiment, an optical input/output bus is realized between first and second integrated circuit nodes 107 and 109 using infrared light through the silicon semiconductor substrate 153 and the back side 147 of integrated circuit die 101 through the optical assembly 125 of heat sink 123, which is thermally and optically coupled to the back side 147 of integrated circuit die 101.

With the back side optical input/output bus of the present invention, there is a reduced need to drive large external capacitive loads, which results in smaller input/output driver circuitry in integrated circuit die 101. This result has the benefit of less integrated circuit die area being sacrificed for large input/output driver circuitry and therefore results in a smaller integrated circuit die 101.

In addition, with smaller integrated circuit input/output drivers in integrated circuit die 101, a reduced amount of power is consumed in accordance with the teachings of the presently described optical input/output configuration. Furthermore, by using optical based input/output signals between the nodes of an integrated circuit, the round trip delay of signals traveling between the nodes of an integrated circuit is also reduced, resulting in even faster integrated circuit performance.

Another benefit of the optical input/output bus configuration of the present invention is that there is also a reduction in noise since there will be no more ground bouncing cross talk or other effects commonly found in electrical input/outputs. In addition, by not being constrained any longer with the need for placing input/output circuitry around the perimeter of an integrated circuit die, a significant reduction in integrated circuit die area and chip layout may also be possible.

In another embodiment, the optical input/output bus method and apparatus of the present invention may be utilized for interchip optical input/output bus operations. For instance, the optical input/output bus of the present invention may also be used for communications between a plurality of flip chip packaged integrated circuit dice, such as for example but not limited to optical input/output between central processing units (CPUs) and off chip caches. Other embodiments of the present invention may be utilized with multiprocessor connections, multichip module (MCM) and processor card based technology, in addition to the intrachip optical input/output connection described in FIG. 1.

Figure 2:
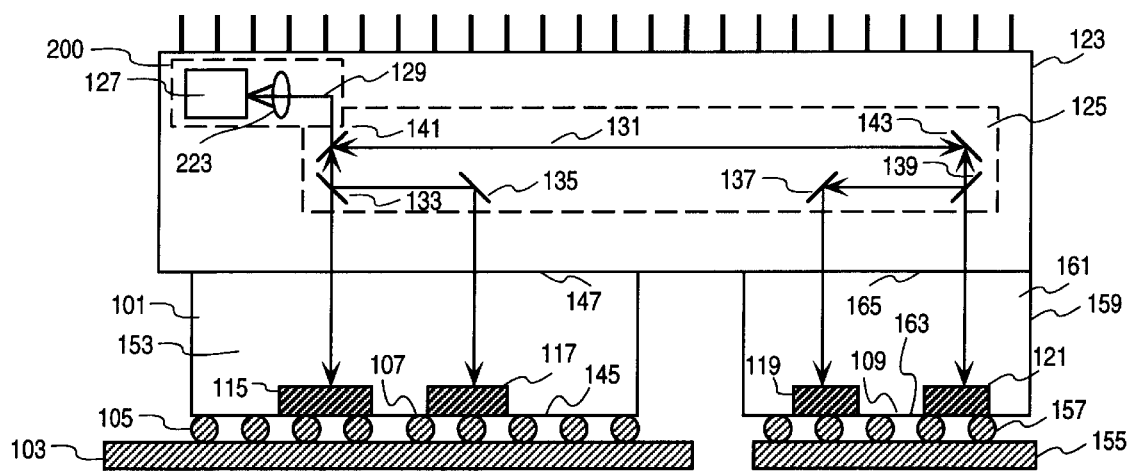
FIG. 2 is an illustration of another embodiment of a cross section of a plurality of flip chip packaged integrated circuit dice with optical input/output devices disposed within the semiconductor substrates and an attached heat sink with an optical assembly in accordance with the teachings of the present invention.

To illustrate, FIG. 2 is an illustration of another embodiment of an optical input/output bus in an integrated circuit in accordance with the teachings of the present invention. As shown in FIG. 2, a first integrated circuit die 101, which is a flip chip packaged integrated circuit die, is coupled to a first package substrate 103 through ball bonds 105. A second integrated circuit die 159, which is also a flip chip packaged integrated circuit die, is coupled to a second package substrate 155 through ball bonds 157. In one embodiment, first integrated circuit die 101 may be a CPU and second integrated circuit die 159 may be an off-chip cache.

It is appreciated that other chip combinations with a plurality of integrated circuit dice may utilize optical input/output in accordance with the teachings of the present invention. For instance, in yet another embodiment, first and second integrated circuit dice 101 and 159 may both be coupled to the same package substrate and include an optical input/output bus in accordance with the teachings of the present invention. Such an embodiment could be utilized in, for example, MCM configurations.

Referring back to the embodiment illustrated in FIG. 2, integrated circuit die 101 includes a first integrated circuit node 107. Second integrated circuit die 159 includes a second integrated circuit node 109. In one embodiment, first and second optical input/output devices 115 and 117 are disposed within first semiconductor substrate 153 in first integrated circuit die 101. First and second optical input/output devices 115 and 117 are coupled to first integrated circuit node 107 in first integrated circuit die 101. Third and fourth optical input/output devices 119 and 121 are disposed within second semiconductor substrate 161 of second integrated circuit die 159. Third and fourth optical input/output devices 119 and 121 are coupled to a second integrated circuit node 109 in second integrated circuit die 159.

In one embodiment, a thermal conductor or heat sink 123 is thermally and optically coupled to back sides 147 and 165 of integrated circuit dice 101 and 159, respectively. Heat sink 123 of FIG. 2 also includes an optical unit 200 and an optical assembly 125. Heat sink 123, optical unit 200 and optical assembly 125 correspond to and perform substantially the same function as heat sink 123, optical unit 200 and optical assembly 125 of FIG. 1.

Therefore, an optical input/output bus is realized between first and second integrated circuit nodes 107 and 109 of first and second integrated circuit dice 101 and 159, respectively, in accordance with the teachings of the present invention. In one embodiment, semiconductor substrates 153 and 161 include silicon and integrated circuit dice 101 and 159 include existing present day CMOS processing technology.

Figure 3:
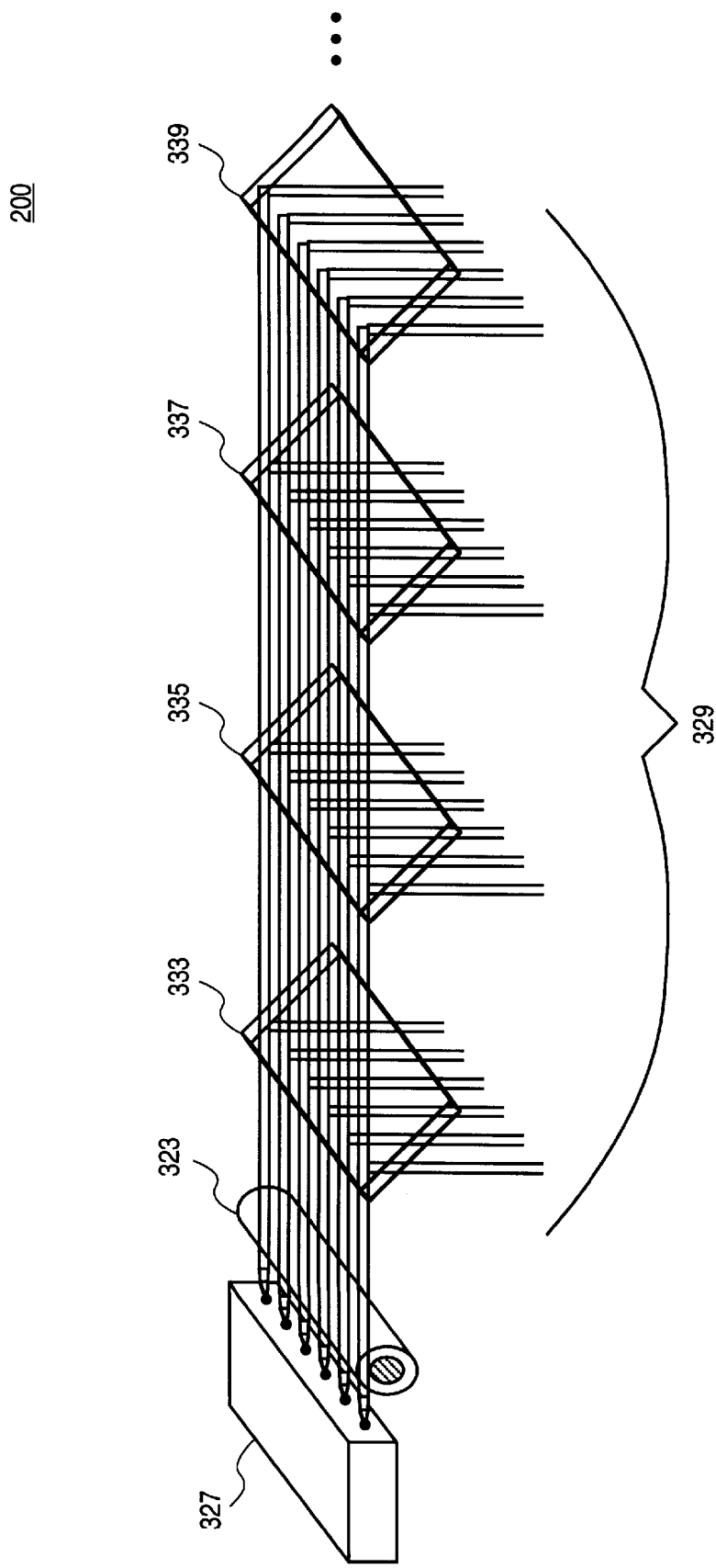
FIG. 3 is a three dimensional illustration of one embodiment of an optical unit generating a plurality of light beams in accordance with the teachings of the present invention.

FIG. 3 is a three dimensional illustration of one embodiment of the optical unit 200 in accordance with the teachings of the present invention. In one embodiment, optical unit 200 of FIG. 3 includes a light source 327, a plurality of lenses 323, a first beam splitter/deflector 333, a second beam splitter/deflector 335, a third beam splitter/deflector 337 and a fourth beam splitter/deflector 339. In one embodiment, light source 327 is a laser strip diode that includes a plurality of light sources, each of which is used to generate a corresponding one of a plurality of light beams 329.

In one embodiment, light source 327 includes N side emitting elements where N is given by the specific optical bus structure. For instance, if the specific optical bus structure is 256 bits wide, then N is equal to 256. If the specific optical bus structure is 1024 bits wide, then N is equal to 1024. Accordingly, each one of the plurality of light beams 329 in one embodiment correspond to one bit line of the N bit optical bus.

In another embodiment, the plurality of side emitting elements are combined to generate each individual light beam of light source 327 to improve reliability. As a result, the reliability of system operation of the presently described optical input/output bus is improved in the event that one of the side emitting elements fails during operation.

In yet another embodiment, light source 327 includes a single beam emitting laser diode and a hologram, or diffractive element, to generate the plurality of light beams 329 using known techniques. The single laser beam generated by the single beam emitting laser diode of light source 327 is passed through the hologram or diffractive optic element which splits the single beam into N beams for the N bit wide optical bus. Allowing the hologram to split the single beam into plurality of beams 329 may result in added flexibility in the optical bus layout as well as increased reliability.

As shown in the embodiment illustrated in FIG. 3, first beam splitter/deflector 333 splits the plurality of light beams 329, directs the plurality of light beams 329 down and directs the plurality of light beams 329 to second beam splitter/deflector 335. Second beam splitter/deflector 335 splits the plurality of light beams 329, directs the plurality of light beams 329 down and directs the plurality of light beams 329 to third beam splitter/deflector 337. Third beam splitter/deflector 337 splits the plurality of light beams 329, directs the plurality of light beams 329 down and directs the plurality of light beams 329 to fourth beam splitter/deflector 339. Fourth beam splitter/deflector 339 splits the plurality of light beams 329 and directs the plurality of light beams 329 down. It is appreciated that other embodiments of optical unit 200 may include a greater number or a fewer number of beam splitters/deflectors to split the plurality of light beams 329 and direct the plurality of light beams 329 down in accordance with the teachings of the present invention.

In one embodiment, optical unit 200 directs each one of the plurality of light beams 329 into optical assemblies similar to the arrangement illustrated in FIGS. 1–2. Indeed, optical assemblies similar to those illustrated in FIGS. 1–2 may be used in other embodiments to route the plurality of light beams 329 among the corresponding optical input/output devices of the optical bus. It is appreciated that the optical arrangement shown in FIG. 3 demonstrates the expandability of the present invention to multiple integrated circuit chips and a large plurality of optical input/output devices distributed throughout an N bit optical bus in accordance with the teachings of the present invention.

Figure 4:
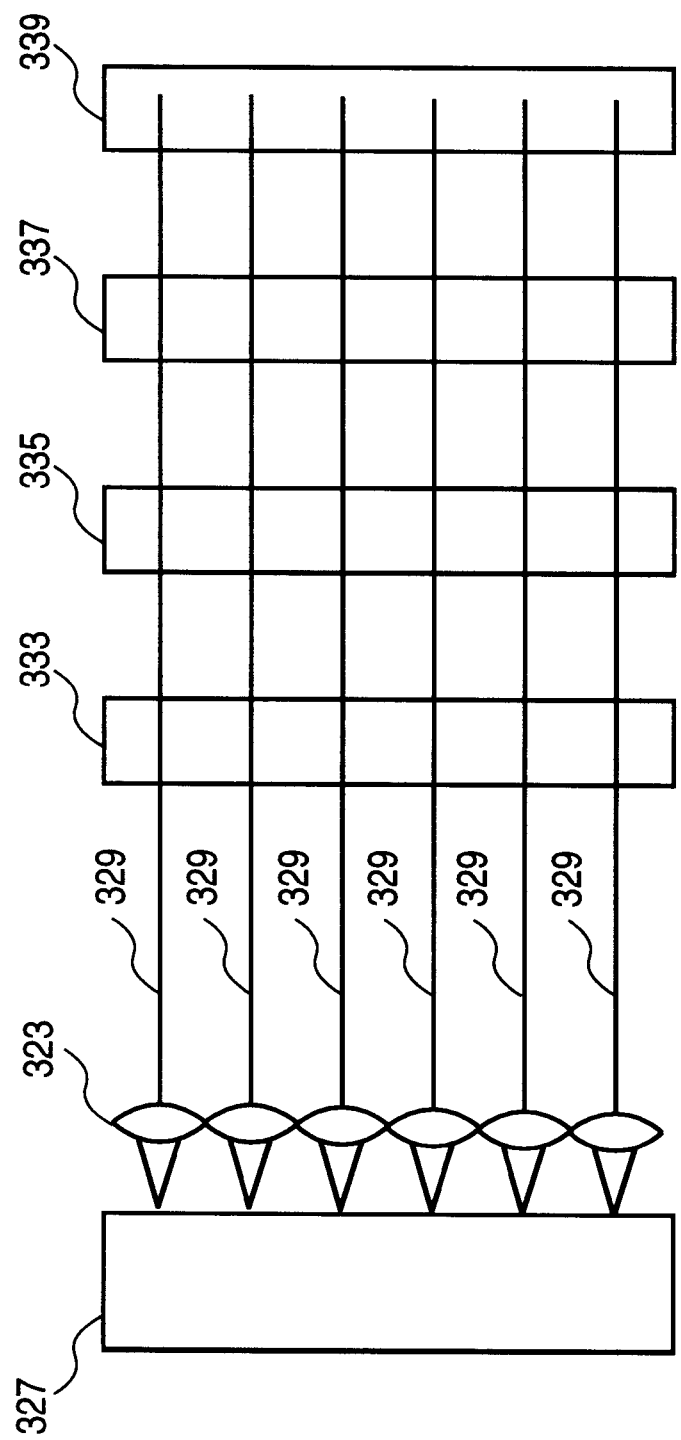
FIG. 4 is a top view illustration of one embodiment of an optical unit generating a plurality of light beams in accordance with the teachings of the present invention.

FIG. 4 is a top view illustration of one embodiment of optical unit 200 in accordance with the teachings of the present invention. As shown, optical unit 200 includes light source 327, which generates a plurality of light beams 329. Each one of the plurality of light beams 329 correspond to one bit of an N bit wide optical bus. Plurality of lenses 323 collimate and focus each one of the plurality of light beams 329. Each one of the plurality of light beams 329 are split and are directed down through the back side of the semiconductor substrate of the integrated circuit die and are directed to a corresponding optical input/output device (not shown) by first beam splitter/deflector 333. First beam splitter/deflector 333 also directs each one of the plurality of light beams 329 to second, third and fourth beam splitters/deflectors 335, 337 and 339, respectively, as discussed above in connection with FIG. 3.

Figure 5:
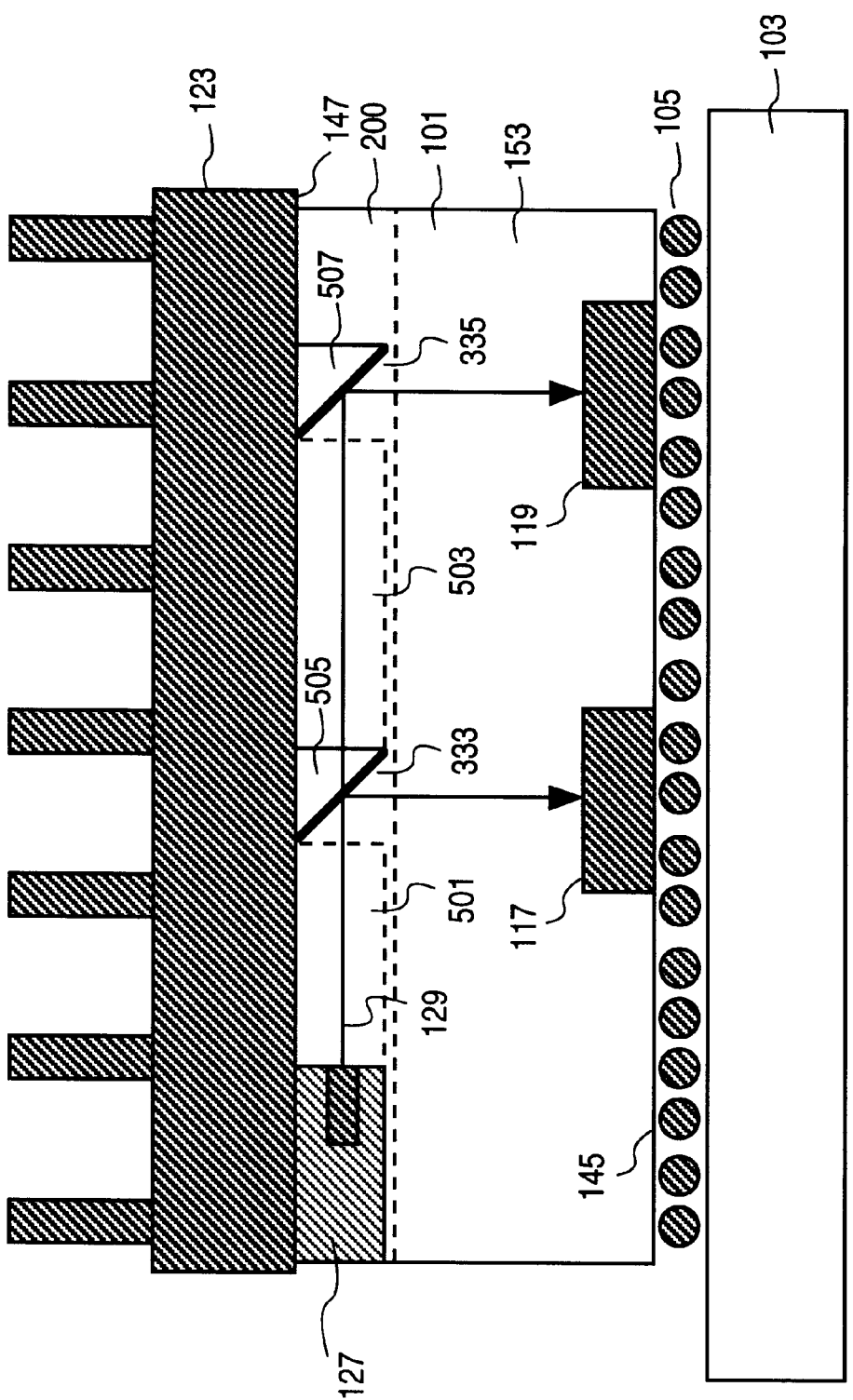
FIG. 5 is an illustration of yet another embodiment of a cross section of a flip chip packaged integrated circuit die with an optical unit embedded within the back side of the semiconductor substrate in accordance with the teachings of the present invention.

FIG. 5 is an illustration of another embodiment of an optical input/output bus in an integrated circuit in accordance with the teachings of the present invention. As shown, a flip chip packaged integrated circuit die 101 is coupled to package substrate 103 through ball bonds 105. In one embodiment, semiconductor substrate 153 is silicon-based and includes existing present day CMOS processing technology. In one embodiment, first optical input/output device 117 and second optical input/output device 119 are disposed within semiconductor substrate 153. In one embodiment, a standard thermal conductor or heat sink 123 is thermally coupled to back side 147 of integrated circuit die 101 to help cool integrated circuit die 101 during operation.

As shown in FIG. 5, one embodiment of the present invention includes an optical unit 200, which is embedded and integrated directly within the semiconductor substrate 153 on the back side 147 of integrated circuit die 101. In the embodiment illustrated in FIG. 5, optical unit 200 includes a light source 127 and first and second beam splitters/deflectors 333 and 335, respectively.

In one embodiment, light source 127 generates an infrared light beam 129, which is directed to first beam splitter/deflector 333. In one embodiment, light beam 129 is split by first beam splitter/deflector 333 and is directed to optical input/output device 117 through semiconductor substrate 153 from back side 147. Light beam 129 also passes through first beam splitter/deflector 333 and is directed to second beam splitter/deflector 335. Second beam splitter/deflector 335 directs light beam 129 to optical input/output device 119 through semiconductor substrate 153 from back side 147. In one embodiment, optical input devices 117 and 119 are optical demodulators and may therefore demodulate a modulated light beam 129 generated by light source 127.

In one embodiment, light source 127 includes a separately manufactured laser strip diode that is attached onto the back side 147 of integrated circuit die 101. Light source 127 may be attached to one side of integrated circuit die 101 into a micro-machined or etched area of the back side 147 of the semiconductor substrate 153. With light source 127 directly attached to the back side 147, as shown, light source 127 may be cooled from both the bottom and top side through the semiconductor substrate 153 and heat sink 123, respectively.

In one embodiment a channel 501 is disposed between light source 127 and first beam splitter/deflector 333, and a channel 503 is disposed between first beam splitter/deflector 333 and second beam splitter/deflector 335. In one embodiment, channels 501 and 503 may be etched or micro-machined into the back side 147. As a result, light beam 129 may travel along back side 147 in channels 501 and 503 in free space without having to travel through semiconductor substrate 153. In one embodiment, channels 501 and 503 are back filled with a thermally conductive infrared transparent material. In one embodiment, channels 501 and 503 are back filled with CVD grown diamond or other similar thermally conductive infrared transparent materials. Channels 501 and 503 allow reduced light beam travel through semiconductor substrate reducing the amount of infrared absorption in silicon and improving efficiency of the infrared laser power of light source 127.

As shown in FIG. 5, first and second beam splitters/deflectors 333 and 335 are fabricated directly into the back side 147 of integrated die 101. In one embodiment, first and second beam splitters/deflectors 333 and 335 included micro-machined or etched angled surfaces in back side 147 of semiconductor substrate 153. In one embodiment, the etched or micro-machined surfaces of first and second beam splitters/deflectors 333 and 335 are then back filled with CVD oxide and are partially coated with reflective material 505 and 507, respectively, thus enabling first and second beam splitters/deflectors 333 and 335 to steer and deflect light in accordance with the teachings of the present invention. In one embodiment, reflective material 505 and 507 includes materials such as for example but not limited to aluminum.

FIG. 6A is an illustration of a cross section of one embodiment of the present invention showing how light source 127 may be attached to back side 147 of semiconductor substrate 153 of integrated circuit die 101. As shown, integrated circuit die 101 is coupled to package substrate 103 through ball bonds 105. In one embodiment, light source 127 is coupled to receive power and/or control through via 601 from front side 145 of integrated circuit die 101. In one embodiment, light source 127 may be modulated through via 601. In one embodiment, via 601 is etched through semiconductor substrate 153 and is filled with a conductive material, such as for example but not limited to aluminum. As a result, in one embodiment, light source 127 may be powered by the same power source that is used to power integrated circuit die 101.

FIG. 6B is an illustration of a cross section of another embodiment of the present invention showing how light source 127 may be attached to back side 147 of semiconductor substrate 153 of integrated circuit die 101. As shown, integrated circuit die 101 is coupled to package substrate 103 through ball bonds 105. In one embodiment, light source 127 is coupled to receive power from a power supply 603, which is external to integrated circuit die 101. As a result, in one embodiment, light source 127 may be powered separately from integrated circuit die 101. In one embodiment, light source 127 is simply attached with thermal grease or epoxy into an etched or micro-machined groove in back side 147 of semiconductor substrate 153 of integrated circuit die 101.

Figure 7:
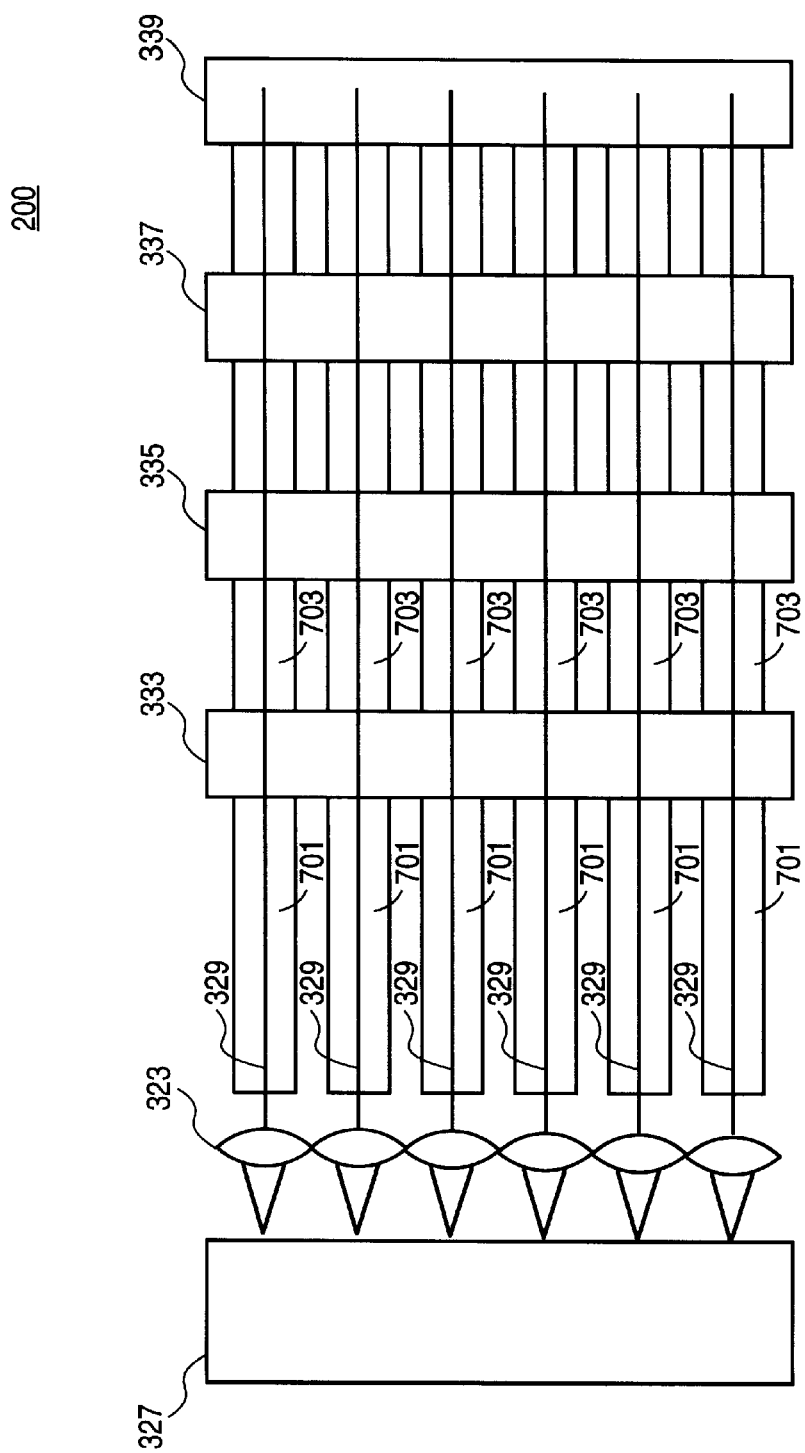
FIG. 7 is a top view illustration of another embodiment of an optical unit with the plurality of light beams passing through channels in the semiconductor substrate in accordance with the teachings of the present invention.

FIG. 7 is a top view illustration of one embodiment of an optical unit 200 similar to the embodiments illustrated in FIG. 5. As shown, optical unit 200 includes light source 327, which generates a plurality of light beams 329. Each one of the plurality of light beams 329 correspond to one bit of an N bit wide optical bus. Plurality of lenses 323 collimate and focus each one of the plurality of light beams 329. Each one of the plurality of light beams 329 are split and are directed down through the back side of the semiconductor substrate of the integrated circuit die and are directed to a corresponding optical input/output device (not shown) by first beam splitter/deflector 333. First beam splitter/deflector 333 also directs each one of the plurality of light beams 329 to second, third and fourth beam splitters/deflectors 335, 337 and 339, respectively.

As shown in FIG. 7, optical unit 200 also includes a plurality of first channels 701 disposed between light source 327/lenses 323 and first beam splitter/deflector 333. A plurality of second channels 703 is disposed between first beam splitter/deflector 333 and second beam splitter/deflector 335. As shown, there are a plurality of channels between each of the beam splitters/deflectors 333, 335, 337 and 339 along each respective path of the plurality of light beams 329. In one embodiment, each one of the plurality of channels 701 and 703 may be etched or micro-machined into the back side of the semiconductor substrate. As a result, each one of the plurality of light beams 329 may travel along the back side of the semiconductor substrate in a corresponding one of the channels 701 or 703 in free space without having to travel through semiconductor substrate while passing through channels 701 or 703. The plurality of channels 701 and 703 allow reduced light beam travel through semiconductor substrate reducing the amount of infrared absorption in silicon and improving efficiency of the infrared laser power of light source 327.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An optical bus, comprising:
   an optical unit that generates a plurality of light beams, each one of the plurality of light beams corresponding to one bit line of the optical bus; and
   an optical assembly that directs each one of the plurality of light beams through a back side of an integrated circuit die onto a corresponding one of a plurality of optical output devices disposed within a semiconductor substrate of the integrated circuit die, the optical assembly to direct each one of a plurality of deflected light beams deflected from the plurality of optical output devices onto a corresponding one of a plurality of optical input devices disposed within the semiconductor substrate of the integrated circuit die, the integrated circuit die having a front side and the back side, the back side including the semiconductor substrate of the integrated circuit die.

2. The optical bus of claim 1 wherein the optical unit comprises:
   a light source that generates the plurality of light beams; and
   a lens that focuses and collimates the plurality of light beams, the lens optically coupled between the light source and the optical assembly.

3. The optical bus of claim 1 wherein the optical unit and the optical assembly are disposed within a thermal conductor to be thermally coupled to the back side of the integrated circuit die.

4. The optical bus of claim 1 wherein the optical output devices comprise optical modulators and the optical input devices comprise optical demodulators.

5. The optical bus of claim 1 wherein the plurality of light beams and the plurality of deflected light beams comprise infrared light and wherein the semiconductor substrate comprises silicon.

6. The optical bus of claim 1 wherein the optical assembly comprises:
   a first beam splitter/deflector that directs at least one of the plurality of light beams to at least one of the plurality of optical output devices, the first beam splitter/deflector optically coupled between the optical unit and the plurality of optical output devices; and a second beam deflector that directs at least one of the plurality of deflected light beams to at least one of the optical input devices, the second beam deflector optically coupled to receive the at least one of the plurality of deflected light beams from the first beam splitter/deflector.

7. The optical bus of claim 1 wherein the integrated circuit die comprises a flip chip packaged integrated circuit die.

8. The optical bus of claim 1 wherein the optical unit and the optical assembly are disposed within the back side of the integrated circuit die.

9. The optical bus of claim 1 wherein the optical unit comprises:

a light source that generates an individual light beam; and a diffractive element that splits the individual light beam into the plurality of light beams.

10. An optical bus, comprising:

an infrared light source that generates a plurality of light beams, the light source embedded into a back side of a semiconductor substrate of an integrated circuit die, the integrated circuit die having a front side and the back side, the back side including the semiconductor substrate of the integrated circuit die;

a first beam splitter/deflector that directs at least one of the plurality of light beams through the back side of the semiconductor substrate onto a corresponding one of a plurality of optical output devices disposed within the semiconductor substrate, the first beam splitter/deflector embedded into the back side of the semiconductor substrate; and a second beam deflector that directs the at least one of the plurality of light beams through the back side of the semiconductor substrate onto an optical input device disposed within the semiconductor substrate, the second beam deflector embedded into the back side of the semiconductor substrate, the second beam deflector optically coupled to receive the at least one of the plurality of light beams from the first beam splitter/deflector.

11. The optical bus of claim 10 wherein the semiconductor substrate includes a first channel disposed between the light source and the first beam splitter/deflector such that the light source and the first beam splitter/deflector are optically coupled with the at least one of the plurality of light beams passing through the first channel and without passing through the semiconductor substrate.

12. The optical bus of claim 11 wherein the semiconductor substrate includes a second channel disposed between the first beam splitter/deflector and the second beam deflector such that the at least one of the plurality of light beams is directed from the first beam splitter/deflector through the second channel to the second beam deflector without passing through the semiconductor substrate.

13. The optical bus of claim 10 wherein power and control are coupled to the light source through the semiconductor substrate from the front side of the integrated circuit die.

14. The optical bus of claim 10 wherein power is coupled to the light source from a power source external to the integrated circuit die.

15. The optical bus of claim 10 wherein the first beam splitter/deflector and the second beam deflector are fabricated into a back side surface of the semiconductor substrate.

16. The optical bus of claim 15 wherein the first beam splitter/deflector and the second beam deflector include a reflective material deposited over respective angled surfaces disposed on the back side surface of the semiconductor substrate.

17. The optical bus of claim 12 wherein the first and second channels include first and second grooves, respectively, disposed in a back side surface of the semiconductor substrate.

18. An optical bus, comprising:

an optical unit that generates a plurality of light beams, each one of the plurality of light beams corresponding to one bit line of the optical bus; and an optical assembly that directs each one of the plurality of light beams through a back side of a first integrated circuit die onto a corresponding one of a plurality of optical output devices disposed within a semiconductor substrate of the first integrated circuit die, the first integrated circuit die having a front side and the back side, the back side of the first integrated circuit die including the semiconductor substrate of the first integrated circuit die, the optical assembly to direct each one of a plurality of deflected light beams deflected from the plurality of optical output devices onto a corresponding one of a plurality of optical input devices disposed within a semiconductor substrate of a second integrated circuit die, the second integrated circuit die having a front side and a back side, the back side of the second integrated circuit die including the semiconductor substrate of the integrated circuit die.

19. The optical bus of claim 18 wherein the optical unit and the optical assembly are disposed within a thermal conductor to be thermally coupled to the back sides of the first and second integrated circuit dice.

20. The optical bus of claim 18 wherein the plurality of optical output devices comprise optical modulators and the plurality of optical input devices comprise optical demodulators.

21. The optical bus of claim 18 wherein the plurality of light beams and the plurality of deflected light beams comprise infrared light and wherein the semiconductor substrates of the first and second integrated circuit dice comprise silicon.

22. The optical bus of claim 18 wherein the optical assembly comprises:

a first beam splitter/deflector that directs at least one of the plurality of light beams to at least one of the plurality of optical output devices, the first beam splitter/deflector optically coupled between the optical unit and the plurality of optical output devices; and a second beam deflector that directs each one of the plurality of light beams to at least one of the optical input devices, the second beam deflector optically coupled to receive the at least one of the plurality of light beams from the first beam splitter/deflector.

23. The optical bus of claim 18 wherein the first integrated circuit die comprises a processor and the second integrated circuit die comprises an off chip cache.

24. A method of providing an optical bus, comprising:

directing a plurality of light beams through a back side of a semiconductor substrate of an integrated circuit die onto corresponding ones of a plurality of optical output devices disposed within the semiconductor substrate of the integrated circuit die, the integrated circuit die having a front side and the back side, the back side including the semiconductor substrate of the integrated circuit die;

deflecting the plurality of light beams from the plurality of optical output devices such that a plurality of deflected light beams are directed through the back side of the integrated circuit die to an optical assembly;

deflecting the plurality of deflected light beams through the back side of the semiconductor substrate of the integrated circuit onto corresponding ones of a plurality of optical input devices disposed within the semiconductor substrate of the integrated circuit die.

25. The method of claim 24 wherein directing the plurality of light beams through the back side of the semiconductor substrate of the integrated circuit die onto the corresponding ones of the plurality of optical output devices includes focusing and collimating the plurality of light beams.

26. A method of providing an optical bus, comprising:

embedding a light source that generates a plurality of light beams within a back side of a semiconductor substrate of an integrated circuit die, the integrated circuit die having a front side and the back side, the back side including the semiconductor substrate of the integrated circuit die;

embedding a first beam splitter/deflector within the back side of the semiconductor substrate that directs the plurality of light beams through the back side of the semiconductor substrate of the integrated circuit die onto corresponding first optical input devices disposed within the semiconductor substrate of the integrated circuit die; and embedding a second beam deflector that directs the plurality of light beams through the back side of the semiconductor substrate of the integrated circuit die onto corresponding second optical input devices disposed within the semiconductor substrate of the integrated circuit die.

27. The method of claim 26 further comprising:

forming a first channel in the semiconductor substrate between the light source and the first beam splitter/deflector; and forming a second channel in the semiconductor substrate between the first beam splitter/deflector and the second beam deflector, such that at least one of the plurality of light beams is directed through the first channel and the second channel, wherein the light source, the first beam splitter/deflector and the second beam deflector are optically coupled without the at least one of the plurality of light beams passing through the semiconductor substrate.

28. The method of claim 27 wherein directing the at least one of the plurality of light beams with the first beam splitter/deflector and directing the at least one of the plurality of light beams with the second beam deflector comprise:

forming a first angled surface on the back side surface of the semiconductor substrate to form the first beam splitter/deflector; and forming a second angled surface on the back side surface of the semiconductor substrate to form the second beam deflector.

29. The method of claim 28 further comprising depositing a reflective material over the first and second angled surfaces to form the first beam splitter/deflector and second beam deflector, respectively.

30. A method of providing an optical bus, comprising:

directing a plurality of light beams through a back side of a semiconductor substrate of an integrated circuit die onto corresponding optical output devices disposed within the semiconductor substrate of the integrated circuit die, the integrated circuit die having a front side and the back side, the back side including the semiconductor substrate of the integrated circuit die; and directing the plurality of light beams deflected from the optical output devices through the back side of the semiconductor substrate of the integrated circuit onto corresponding optical input devices disposed within the semiconductor substrate of the integrated circuit die.

31. The method of claim 30 wherein directing the plurality of light beams through the back side of the semiconductor substrate of the integrated circuit die onto the corresponding optical output devices includes focusing and collimating the plurality of light beams.

* * * * *